United States Patent [19]
Knemeyer et al.

[11] 3,920,966
[45] Nov. 18, 1975

[54] BLENDED MANUAL-AUTOMATIC CONTROL SYSTEM

[75] Inventors: Siegfried Knemeyer, Yellow Springs; Kenneth W. McElreath, Dayton, both of Ohio

[73] Assignee: The United States of America as represented by the Secretary of the Air Force, Washington, D.C.

[22] Filed: Apr. 29, 1974

[21] Appl. No.: 464,876

[52] U.S. Cl. ..... 235/150.2; 235/150.27; 244/17.13; 244/77 D; 318/584
[51] Int. Cl.[2] .......................................... B64C 13/02
[58] Field of Search......... 235/150.2, 150.27, 151.1; 244/17.13, 77 D, 77 F, 83 E, 83 D; 318/2, 591, 580, 584, 585, 586, 590

[56] References Cited
UNITED STATES PATENTS

| | | | |
|---|---|---|---|
| 3,095,168 | 6/1963 | Treadwell et al. | 318/591 |
| 3,485,463 | 12/1969 | Miller | 244/77 F |
| 3,521,838 | 7/1970 | Buffum et al. | 244/17.13 |
| 3,522,729 | 8/1970 | Miller | 244/77 D |
| 3,569,681 | 3/1971 | Koepcke | 235/151.1 |
| 3,627,236 | 12/1971 | Hess | 244/77 D |
| 3,662,976 | 5/1972 | Gesler | 244/77 D |

Primary Examiner—Felix D. Gruber
Attorney, Agent, or Firm—Joseph E. Rusz; James S. Shannon

[57] ABSTRACT

A control method comprising generating a command signal proportional to the difference between a desired control effect and the instantaneous control effect, splitting the command signal into a high frequency portion and a low frequency portion, applying the high frequency portion to a mechanical servomechanism for automatically executing the high frequency portion of the command, and displaying only the low frequency long term portion of the command for manual execution. As a specific example, apparatus is disclosed for controlling the airspeed of a helicopter in accordance with the method.

8 Claims, 9 Drawing Figures

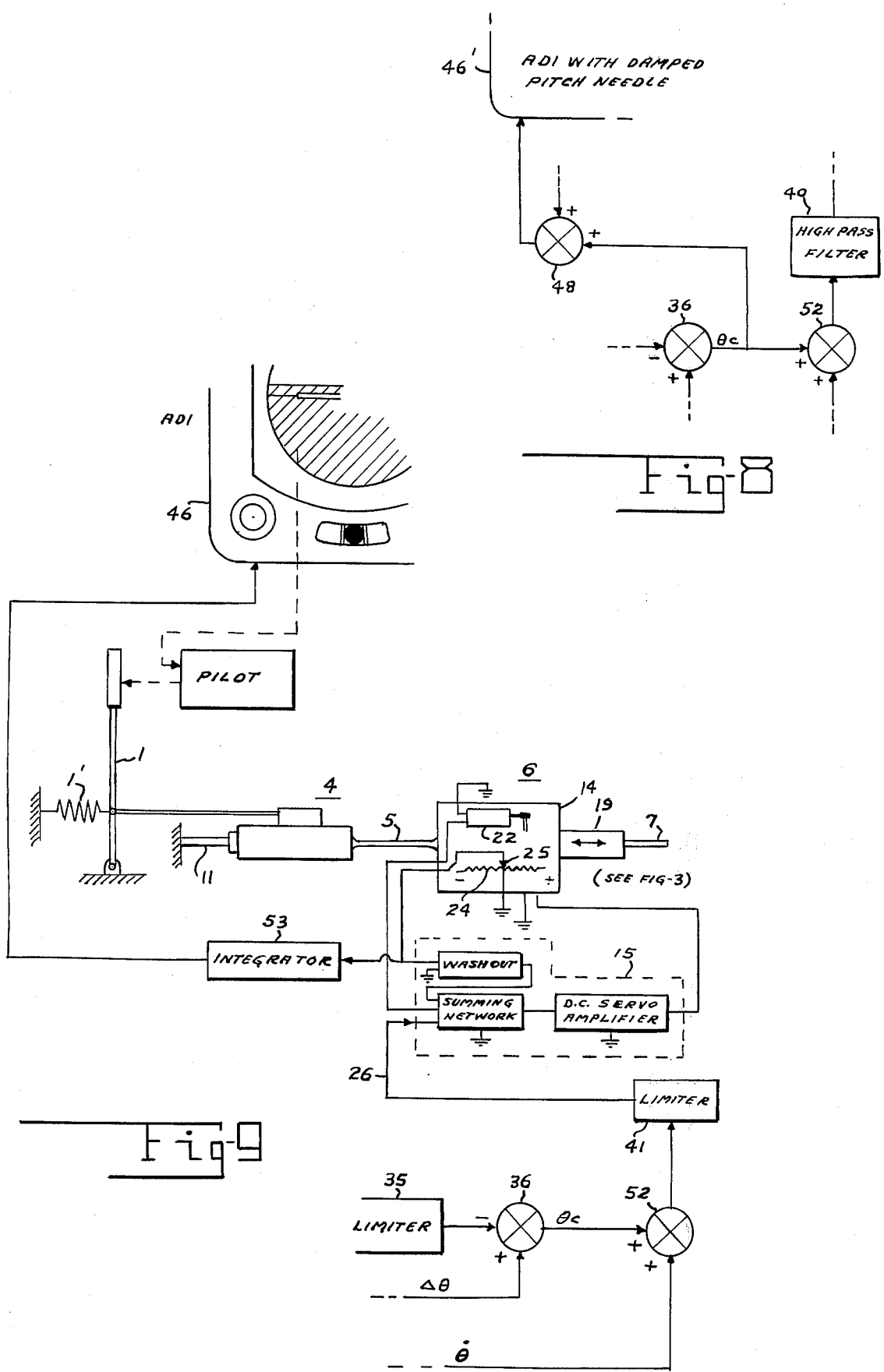

BLENDED MANUAL-AUTOMATIC CONTROL SYSTEM

RIGHTS OF THE GOVERNMENT

The invention described herein may be manufactured and used by or for the Government of the United States for all governmental purposes without the payment of any royalty.

BACKGROUND OF THE INVENTION

The invention relates to control systems and is particularly concerned with, but not limited to, flight control systems for aircraft.

Certain control situations require that a human operator, the pilot in the case of an aircraft, be an active element in the control loop in order to achieve the desired flexibility of control. The operator is an active element in the control loop when he manually carries out, through an operator input device to the control system, a displayed command that is in the nature of an error signal derived as the difference between a prescribed control result and the actual control result. An example may be found in the flight control system for a helicopter disclosed in Knemeyer and Fileccia U.S. Pat. No. 3,800,127 where the pilot, acting through the collective control lever, must control the vertical rate of the aircraft in accordance with a displayed collective command computed to achieve a prescribed flight angle.

As an element in the control loop, the human operator has two limitations. One is the limit on his frequency response, and the other is the limit on his ability to concentrate on many demanding tasks at the same time. These limitations are of particular significance where the command is subject to rapid short term variations as a result of rapid short term external disturbances of the thing being controlled. For example, in the system of the referenced patent, short term disturbances in the vertical rate may occur under gusty conditions with such rapidity as to produce command variations at frequencies so high as to require excesive concentration on this control at the expense of the other flight controls, or possibly so high as to exceed the pilot's capability altogether.

Fully automatic flight control systems are known in the art. A fully automatic version of the flight control system of the referenced patent is shown in FIGS. 5a and 5b of that patent. Such systems automatically counteract the effect of external disturbances. Pilot inputs through the primary controls are not excluded in all automatic systems, the system in the patent permitting such inputs; however, the pilot is not an element in the control loop in automatic systems.

SUMMARY OF THE INVENTION

The invention pertains to control systems in which the operator manually exercises control in response to a computed command signal displayed to him, and is therefore an active element in the control system. It is the purpose of the invention to reduce the work and concentration required of the operator in such systems.

Briefly, this purpose is accomplished by a blending of manual and automatic control. The command signal is split on a frequency basis into two parts: a low frequency part containing the long term components of the command signal that are well within the frequency response capabilities of the operator and a high frequency part containing the remainder of the command signal. Only the low frequency or long term components are displayed to the operator for execution through the manual input to the control system. The high frequency or short term components are applied to an automatic control system the output of which is algebraically added in series with the output of the manual control in such manner that no mechanical feedback to the manual control occurs and the operator is unaware of the operation of the automatic system. Without the need to manually execute the high frequency commands, which are usually those resulting from external short duration disturbances, the work and concentration required of the operator are greatly reduced.

The following describes a specific application of the invention to the airspeed control of a helicopter.

BRIEF DESCRIPTION OF THE DRAWINGS

FIGS. 8 and 9 show variations of FIG. 1.

DESCRIPTION OF A SPECIFIC EMBODIMENT

Cyclic pitch, i.e., the cyclic variation of the pitch angle of the main rotor blades at the rotational period, is the primary airspeed control in helicopters. This variation tilts the plane of the rotating blades away from the horizontal and tilts the main rotor thrust vector, which is always normal to the plane of the rotating blades, away from the vertical. The degree of tilt depends upon the amplitude of the cyclic pitch variation and the direction depends upon the phase of the cyclic variation. The tilted thrust vector produces a moment about the pitch or roll axis of the aircraft, or both, depending upon the direction of the tilt, and therefore cyclic pitch is used to control the pitch and roll attitudes of the aircraft. The tilt of the thrust vector also results in a horizontal component of thrust the magnitude and direction of which depend upon the amplitude and phase of the cycle pitch variation. cyclic pitch therefore controls airspeed.

Figure 1:
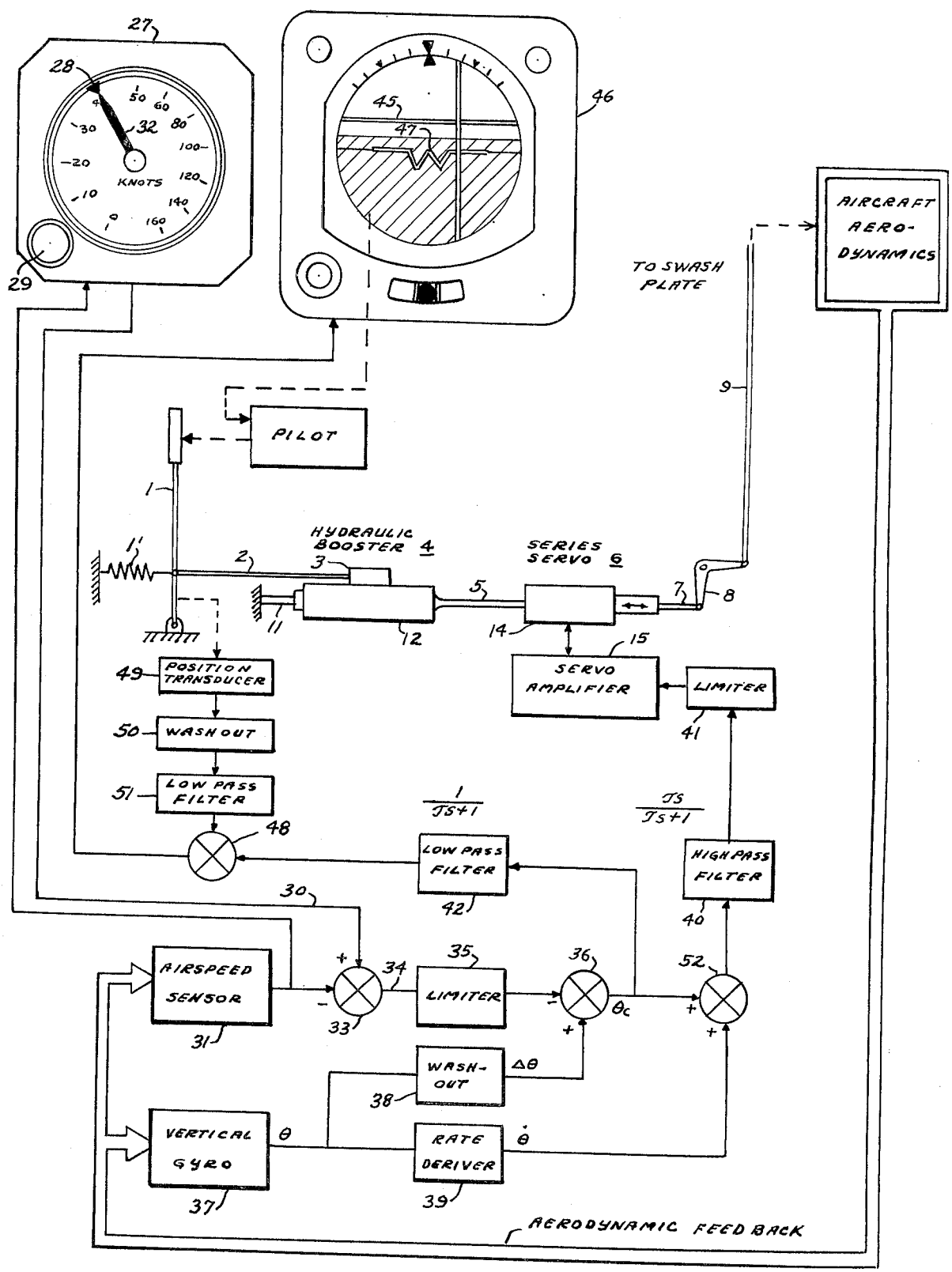
FIG. 1 shows the invention as applied to the airspeed control system of a helicopter.

Referring to FIG. 1, the cyclic stick 1 is the primary manual control through which the pilot varies the cyclic pitch. The movement of the stick, which can be in any direction, is resolved into orthogonal pitch and roll components, the pitch component being the fore and aft component and the roll component being the lateral component. The two components are transmitted by pitch and roll linkages to a swash plate located beneath the main rotor hub and rotatably coupled to the pitch adjusting mechanisms of the main rotor blades. In this manner the cyclic stick may be used to tilt the swash plate and thereby the plane of the main rotor in any direction.

Only the pitch linkage for transmitting the fore and aft movement of the stick 1 to the swash plate is shown in FIG. 1, since this is the movement used in controlling airspeed. The pitch linkage comprises: a link 2 between stick 1 and pilot valve 3 of hydraulic booster 4; and link 5 between booster 4 and series servo 6; and a coupling between the series servo 6 and the swash plate (not shown) comprising link 7, bellcrank 8, and link 9. Hydraulic booster 4 simply causes link 5 to follow link 2 with an increased force which reacts against the airframe. Series servo 6 acts in response to an applied command signal to increase or decrease the spacing between links 5 and 7 as called for by the directional information in the command signal. Therefore, there are two inputs to the swash plate pitch linkage: one through cyclic stick 1, and the other through series servo 6.

Figure 2:
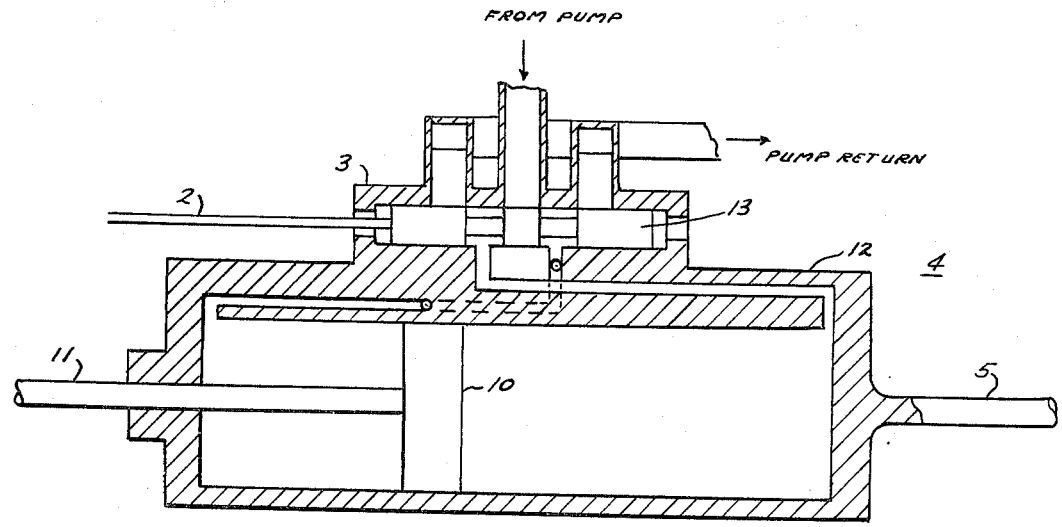
FIG. 2 shows the details of the hydraulic booster in FIG. 1.
Figure 3:
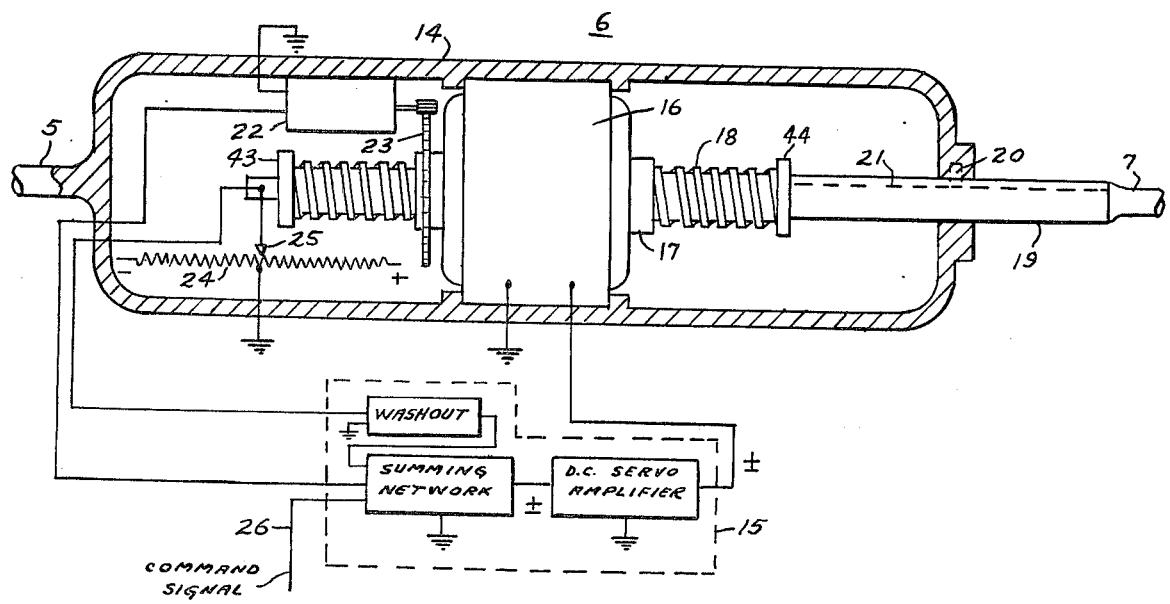
FIG. 3 shows the detail of the series servomechanism in FIG. 1.

Hydraulic boosters and series servomechanisms are well known in the art and may take any suitable form, FIGS. 2 and 3 showing examples of each. Referring to FIG. 2, piston 10 is attached by piston rod 11 to the airframe while cylinder 12 is attached to link 5. Pilot valve 3 is a spool valve the body of which is attached to cylinder 12 and the spool 13 of which is attached to link 2 and thence to cyclic stick 1. The cylinder 12 of the booster automatically seeks a position where spool 13 is centered in the valve, as shown in the drawing. In this position, hydraulic pressure from the pump is cut off from the cylinder by the central portion of the spool and the outlets for hydraulic fluid from the cylinder are blocked by the outer portions of the spool, thus effectively locking the piston at its position in the cylinder. Since piston 10 is attached to the airframe, movement of link 2 in either direction by the cyclic stick 1 is followed by an equal movement of cylinder 12 in the same direction by the same amount. This occurs because a slight displacement of spool 13 from its central position in the valve admits hydraulic pressure to the proper end of the cylinder to move the cylinder in the same direction as the spool until the valve is recentered. Therefore, the motion of link 2 is effectively duplicated by link 5 but with greater force. A spring 1', having equal rates in compression and tension, serves to center the cyclic stick in the pitch direction.

A suitable embodiment of the series servo 6 is shown in FIG. 3. It consists of an electrically driven jackscrew 14, situated between links 5 and 7, and an associated servoamplifier 15. The jackscrew comprises a servomotor 16 which is fixed within the housing and has a relatively large hollow internally threaded shaft 17 that receives screw 18. Link 7 is attached to one end of screw 18 by means of rod 19 which passes through the housing. Rotation of screw 18 relative to the housing is prevented by pin 20 which fits into a groove 21 in rod 19. Motor 16, which is a d.c. motor of the high torque variable speed type, is energized from servoamplifier 15 and runs at a speed proportional to the magnitude of its energization in a direction dependent upon the polarity of the energization. Tachometer generator 22, driven from shaft 17 by gear 23, and potentiometer 24, with slider 25 attached to screw 18, provide d.c. feedbacks proportional to motor speed and screw position, respectively, screw position being measured in either direction from the central or zero position of the screw shown in the drawing. The speed feedback, the washed out screw position feedback, and the command signal on line 26 are algebraically added in the servoamplifier input; and, in a manner well understood in the art, cause the motor 16 to run at a speed directly related to the magnitude of the command signal and in a direction dependent upon the signal polarity but, due to the washed out position feedback, faster at the beginning of an action than at the end to oppose overshoot. Any control exerted by the series servo 6 is algebraically added to any control exerted through the cyclic stick 1 and the hydraulic booster 4. However, because of the construction of booster 4, as illustrated in FIG. 2, the series servo can not react against and cause movement of the control stick. Therefore, the pilot is not aware from the stick of any control inputs to the swash plate pitch linkage from the series servo.

Returning to FIG. 1, to control the airspeed of the helicopter by the blended manual-automatic control method, the pilot sets a desired airspeed into the airspeed indicator 27. This is accomplished through positioning reference pointer 28 opposite the selected airspeed by means of slewing knob 29, which also adjusts an internal d.c. potentiometer to produce a voltage on line 30 proportional to the selected airspeed. Positioning of the indicator 27 may also be accomplished by a slewing motor controlled from a switch located on the cyclic stick; however, for the sake of simplicity, this is not illustrated.

Airspeed sensor 31 produces a d.c. signal proportional to airspeed. This signal is applied to indicator 27 for driving airspeed indicating needle 32 and to subtraction circuit 33 where the difference between the selected airspeed signal and the actual airspeed signal is derived to produce an airspeed error signal on line 34. The error signal is limited to a predetermined maximum value by limiter 35 and applied to subtraction circuit 36 along with a washed out pitch signal $\Delta\theta$ derived from vertical gyro 37, which provides a d.c. signal proportional to the pitch attitude $\theta$ of the aircraft, and washout circuit 38. The difference in these two signals is the basic cyclic pitch command $\theta_c$. The washed out pitch acts as a damping signal to prevent overcontrol that would otherwise occur because of the delay between a change in cyclic pitch and a change in airspeed. As well understood in the art, a washout circuit is one which has an output that is proportional to the time integral of the rate of change of its input and that decays exponentially to zero, or "washes out," when the input ceases to change. Since a change in aircraft pitch follows a change in cyclic pitch more quickly than a change in airspeed, washed out pitch may be used, in effect, to produce an artificial airspeed feedback in the interval between a change in cyclic pitch and a change in airspeed.

Figure 5:
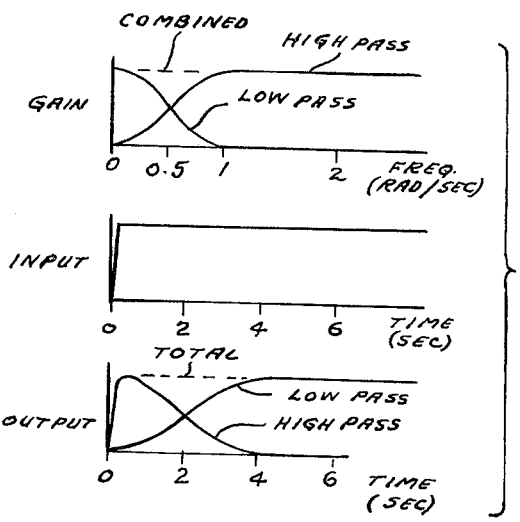
FIG. 5 illustrates the characteristics of the complementary low and high pass filters of FIG. 1.

In accordance with the blended manual-automatic control method, the high frequency or short term components of the basic pitch command signal $\theta_c$ are separated out and applied for automatic execution to the series servomechanism 6. To this end, the algebraic sum of the pitch command signal $\theta_c$ and the rate of change of pitch attitude $\dot{\theta}$, derived from the pitch attitude output of vertical gyro 37 by rate deriver 39, is applied to high pass filter 40. The output of this filter, after being limited to a predetermined maximum by limiter 41, is applied as a command signal to servoamplifier 15 for control of the main rotor cyclic pitch through the series servo in the manner already explained. The rate signal $\dot{\theta}$ causes the rate of change of the aircraft pitch attitude to be proportional to the magnitude of the pitch command. High pass filter 40 is complementary to low pass filter 42, to be discussed later, as seen in FIG. 5. This filter passes all pitch command components having frequencies above approximately 0.5 radians per second. The Laplace transform of the transfer function of this filter is shown in the drawing, the value of the time constant $\tau$ being approximately 2 seconds. This means that the filter has a 2 second washout, or, in other words, that a signal applied to its input of longer than 2 seconds duration will produce no effective output after 2 seconds.

The automatic system operates to stabilize the airspeed against the effects of short term external disturbances, such as gusts. By short term is meant disturbances lasting less than 2 seconds, or of frequency greater than 0.5 radian per second. The high frequency disturbance produces a short term airspeed error signal and a resulting short term pitch command at the output of filter 40 which acts through the series servo to produce a counteracting change in cyclic pitch. The aerodynamic feedback to the airspeed sensor 31 and vertical gyro 37 completes the stabilization loop. As stated earlier, the reaction of series servo 6 in making these short term corrections is against the airframe through the hydraulic fluid, piston 10, and piston rod 11 of the hydraulic booster 4 and is not felt at the cyclic stick 1. Therefore, the pilot is not disturbed by feedback to the controls from the automatic system. The series servo 6 is one of limited authority, as provided by limitations on the magnitude of the applied command signal and by limit switches (not shown) backed up by mechanical stops 43 and 44 (FIG. 3), in order that a system failure can not produce a hard-over control result.

The execution of the short term high frequency commands by the automatic system through the series servo leaves only the long term low frequency commands to the pilot for manual execution, in this case command signal frequencies less than 0.5 radians per second. These frequencies are passed by low pass filter 42 and are applied to control the pitch command needle 45 of ADI (Attitude Director Indicator) 46. The index or reference for this needle is point 47, the displacement of the needle above or below this point indicating the magnitude and direction of the cyclic pitch command. Following the rule of "flying to the needle," the instrument is shown as displaying a pitch up or nose up command, point 47 representing the nose of the aircraft. This command would result from an airspeed that is too high. The pilot responds by pulling the stick backward to reduce the cyclic pitch and thereby the airspeed. As the airspeed falls, the output of airspeed sensor 31 falls toward equality with the reference airspeed signal on line 30. When the two are equal the airspeed error signal and the cyclic pitch command signal are reduced to zero and the needle 45 is at reference point 47.

As stated earlier, there is a lag between the movement of cyclic stick 1 and a change in airspeed. The resulting delayed response of needle 45 is likely to cause the pilot to overcontrol. To counteract this tendency, during the interval between the control input to stick 1 and a change in airspeed a signal of the same polarity as the pitch command is introduced into the command circuit, at adding circuit 48, to provide a movement of needle 45 in anticipation of the change in airspeed. This signal constitutes, in effect, an artificial airspeed feedback during this interval. It is arranged for the signal to decay exponentially or wash out as the effect of the true airspeed feedback through airspeed sensor 31 is felt. This signal anticipates and supplements the artificial feedback derived from washed out pitch, already explained. The anticipatory signal is provided by cyclic stick position transducer 49, washout circuit 50, and a low pass noise filter 51. The position transducer may be simply a d.c. potentiometer providing an output signal of magnitude proportional to the displacement of stick 1 from its central position and with polarity dependent upon the direction of the displacement.

The Laplace transform of the transfer function of low pass filter 42 is shown in the drawing. The time constant $\tau$ is 2 seconds, which means that the filter passes all frequency components of the command signal below 0.5 radians per second and that there is a lag in the output of 2 seconds. This lag results in a 2 second delay in the display of any long term command by the ADI 46. However, as noted earlier, high pass filter 40 produces an instantaneous output for all commands but has a 2 second washout. Therefore, the high frequency system makes the initial response to a long term command but this response washes out as the delayed manual response comes in. Therefore, the manual long term system acts in consonance with the automatic short them system in executing a long term command. The complementary characteristics of filters 40 and 42 are illustrated in FIG. 5.

The 0.5 radian per second crossover frequency for filters 40 and 42 was arrived at from an analysis of the transfer function relating display movement to control action for a pilot, and from experimentation. The Laplace transform for the transfer function is $$\frac{\text{Control Action}}{\text{Display Movement}} = \frac{(T_1 s + 1)(T_2 s + 1)}{s(T_3^2 s^2 + 2\zeta s + 1)}$$

where
$T_1, T_2, T_3 =$ time constants
$s =$ Laplace operator
$\zeta =$ damping ratio, 2nd order system.

Figure 4:
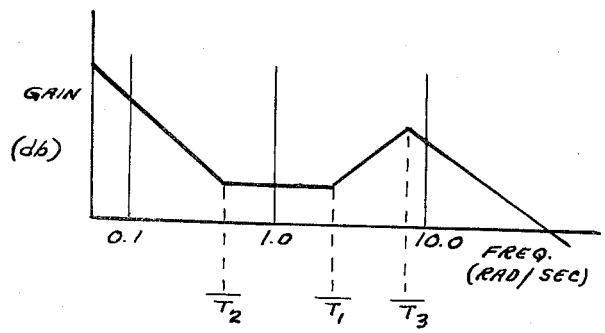
FIG. 4 is the plot of a pilot model.

The plot of this function is shown in FIG. 4. In this diagram, $(1/T_1)$ is the lead corner frequency, $(1/T_2)$ is the integration rollout frequency, and $(1/T_3)$ is the quadratic rolloff frequency. This diagram represents the pilot's ability to follow a displayed command at the control stick. In the range $0 - (1/T_2)$, the pilot can follow the command with ease and with a minimum of concentration. In the range $(1/T_2) - (1/T_1)$, the pilot can follow but more concentration is required. In the range $(1/T_1) - (1/T_3)$, rapidly increasing attention is required until at $(1/T_3)$, the pilot is unable or unwilling to track the display. Above $(1/T_3)$ the diaplay cannot be tracked accurately and the response eventually lags the command to the extent that it may oppose it. By assigning to the automatic system the execution of all inputs of greater than 0.5 radian/second, the control inputs required of the pilot are those which he can integrate and thus perform most easily and effectively. These responses can be accomplished as a result of the pilot's normal instrument scan without requiring constant attention. He can then devote more time to other flying duties.

Figure 6:
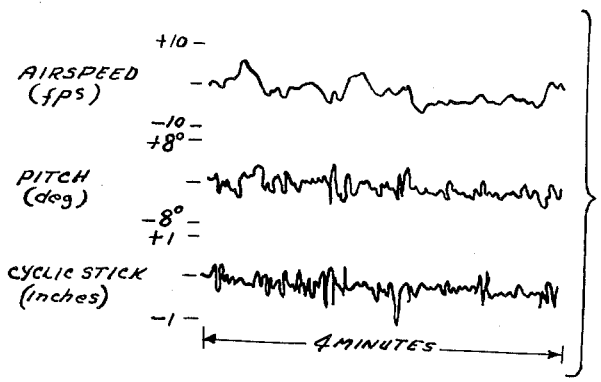
FIG. 6 illustrates performance with all command frequencies applied to the ADI.
Figure 7:
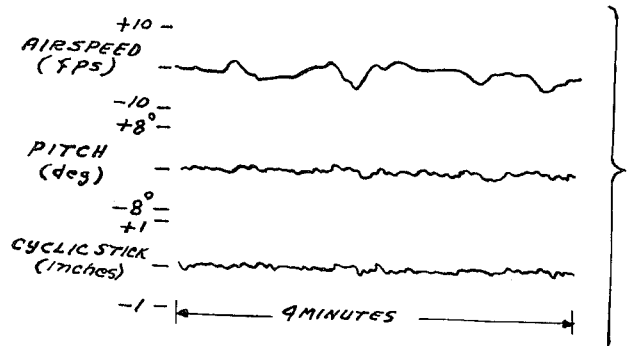
FIG. 7 illustrates performance with the blended system.

FIG. 6 shows recordings taken over a four minute period of airspeed, pitch attitude, and cyclic stick movement for a helicopter, with attitude stabilization, in which the pilot was attempting to maintain a prescribed airspeed manually through the cyclic stick in response to a pitch command displayed on the ADI in conventional manner, i.e., there was no series servo and the displayed command was the total command containing all frequency components. FIG. 7 shows the same situation but with airspeed controlled in accordance with the above described blended manual-automatic system. It is apparent in the latter case that the airspeed variation is of lower frequency with smaller more rounded peaks, and that the pitch attitude variations and cyclic stick movements are greatly reduced. Stick movements are a good indication of pilot workload.

FIG. 8 shows a modification of FIG. 1 in which the low pass filter 42 is omitted and the damping of needle 45 of the ADI is slightly increased. It is possible to operate without the low pass filter since the automatic system operating through the series servo reduces the high frequency variations in $\theta_c$ to a low level. With somewhat increased damping of needle 45 the high frequency variations are barely noticeable to the pilot and do not impede his ability to follow the long term movement of the needle.

Another modification of FIG. 1 shown in FIG. 9 achieves essentially the same result as the system of FIG. 1 without the use of either low or high pass filters in the command circuit. In this system the total pitch command $\theta_c$, damped with pitch rate $\dot{\theta}$, is applied to input 26 of the series servomechanism. All commands, both short and long term, are executed by the series servo. However, in carrying out the long term commands along with the short term commands the series servo undergoes a net or average displacement which may be used as the long term input to the ADI for execution by the pilot. Execution of the long term commands by the pilot removes the net displacements of the series servo and thereby keeps the series servo near the center of its dynamic range. Therefore, the system operates, in effect, to transfer net or average displacements of the series servo to the cyclic stick 1. The long term command signal for the ADI may be derived simply by integrating the signal at contact 25 of the series servo position transducer, as by integrator 53. The integration interval is made sufficiently long so that the displayed signal does not have frequency components higher than approximately 0.5 radian per second.

The above described blended control system may also be applied to the roll, yaw, and collective control systems of a helicopter. For roll, the reference may be roll attitude or rate of turn; for yaw, heading; for the collective, vertical rate. It may be used in the corresponding controls of other types of V/STOL (Vertical/-Short Takeoff and Landing) aircraft such as those of the vectored thrust type. An example would be in the fuel control for precise control of thrust in maneuvers near the ground. In general, the blended method may be used in any control situation where a human operator must exercise control in response to a displayed command.

We claim:

1. A blended manual-automatic system for controlling the magnitude of a variable in which a human operator is an active element in the control loop of the manual part of the system, comprising:
   a. means for generating an error signal proportional to the difference between a desired magnitude of said variable and its actual magnitude, and indicative of the direction of said difference;
   b. first means, having a manual input device, for controlling the magnitude of said variable;
   c. means for displaying the components of said error signal lying below a predetermined frequency to said operator as a command to be manually executed by the operator through said manual input device;
   d. second means, acting in series with said first means and having a command signal input, for controlling the magnitude of said variable independently of said first means in accordance with a command signal applied to its input; and
   e. means for applying the components of said error signal lying above said predetermined frequency as a command signal to the input of said second means.

2. Apparatus as claimed in claim 1 in which said predetermined frequency is approximately 0.5 radians per second.

3. Apparatus as claimed in claim 1 in which (c) includes a low-pass filter through which the error signal passes before display, and in which (e) includes a high pass filter, complementary to said low pass filter about said predetermined frequency, through which the error signal passes before application to the input of said second means.

4. Apparatus as claimed in claim 1 in which (c) comprises a display device having an indicating needle the damping of which is sufficiently high that the responses of the needle to frequencies above said predetermined frequency are barely noticeable to the operator, and in which (e) includes a high pass filter with cutoff at said predetermined frequency through which said error signal passes before application to the input of said second means.

5. Apparatus as claimed in claim 1 in which said variable is the airspeed of a helicopter and said manual input device is the cyclic stick of the helicopter, and in which there are provided in addition means for damping said error signal with washed out pitch before display and means for further damping the error signal with pitch rate before application to the input of said second means.

6. Apparatus as claimed in claim 5 and in addition means for algebraically adding to the error signal before display an artificial airspeed feedback in the form of washed out cyclic stick position.

7. A blended manual-automatic system for controlling the magnitude of a variable in which a human operator is an active element in the control loop of the manual part of the system, comprising:
   a. means for generating an error signal proportional to the difference between a desired magnitude of said variable and its actual magnitude, and indicative of the direction of said difference;
   b. first means, having a manual input device, for controlling the magnitude of said variable;
   c. second means, acting in series with said first means and having a command signal input, for controlling the magnitude of said variable independently of said first means in accordance with a command signal applied to its input, said second means being a servomechanism producing a displacement on either side of a zero position in accordance with the applied command signal;
   d. means for applying said error signal as a command signal to the input of said second means; and
   e. means for displaying the integral of the displacement of said servomechanism from its zero position to said operator as a command to be manually executed by the operator through said manual input device, the integration interval being sufficiently long that the displayed command does not have frequency components higher than approximately 0.5 radians per second.

8. Apparatus as claimed in claim 7 in which said variable is the airspeed of a helicopter and said manual input device is the cyclic stick of the helicopter, and in which there are provided in addition means for damping said error signal with washed out pitch and with pitch rate before application to the input of said second means.

* * * * *